(12) United States Patent
Hou et al.

(10) Patent No.: US 7,954,556 B2
(45) Date of Patent: Jun. 7, 2011

(54) USING A CAN BUS ENGINE TORQUE/SPEED MESSAGE AS LOAD FEEDBACK FOR IMPLEMENT DRAFT CONTROL

(75) Inventors: Yanming Hou, Pleasant Prairie, WI (US); Haibo Guo, Naperville, IL (US)

(73) Assignee: CNH America LLC, New Holland, PA (US)

( * ) Notice: Subject to any disclaimer, the term of this patent is extended or adjusted under 35 U.S.C. 154(b) by 1268 days.

(21) Appl. No.: 11/465,325

(22) Filed: Aug. 17, 2006

(65) Prior Publication Data

US 2008/0053669 A1  Mar. 6, 2008

(51) Int. Cl.
*A01B 63/112* (2006.01)

(52) U.S. Cl. .................................. 172/7; 172/3

(58) Field of Classification Search ................... 172/3, 7, 172/12
See application file for complete search history.

(56) References Cited

U.S. PATENT DOCUMENTS

| | | | |
|---|---|---|---|
| 3,575,241 A | 4/1971 | McKeon et al. | |
| 3,716,104 A | 2/1973 | Koenig et al. | |
| 3,731,746 A | 5/1973 | Walberg | |
| 3,753,467 A | 8/1973 | Wilson | |
| 4,023,622 A | 5/1977 | Gregerson | |
| 4,077,475 A | 3/1978 | Hino et al. | |
| 4,503,916 A | 3/1985 | Wiegardt | |
| 4,807,136 A | 2/1989 | Rutkowski | |
| 5,040,119 A | 8/1991 | Hardy et al. | |
| 5,454,432 A | 10/1995 | Le Clezio | |
| 6,131,062 A * | 10/2000 | Nielsen | 701/50 |
| 6,438,506 B1 | 8/2002 | Yohpe | |
| 6,749,035 B2 | 6/2004 | Bundy | |
| 6,942,595 B2 * | 9/2005 | Hrazdera | 477/37 |
| 2003/0085042 A1 | 5/2003 | Rogala | |
| 2006/0108127 A1 | 5/2006 | Batthala et al. | |

FOREIGN PATENT DOCUMENTS

DE  10120733  10/2002
EP  0176725 A2  4/1986

* cited by examiner

*Primary Examiner* — Thomas B Will
*Assistant Examiner* — Joel Mitchell
(74) *Attorney, Agent, or Firm* — Patrick M. Sheldrake; Michael G. Harms (57) ABSTRACT

A draft load control system for an agricultural tractor having electronic engine and draft load controllers interconnected by a digital communications bus over which parameters for engine load are made readily available to the draft load controller. The draft load control system is suitable for front-mounted, rear-mounted, or towed implements without requiring additional sensing equipment.

11 Claims, 7 Drawing Sheets

PRIOR ART

USING A CAN BUS ENGINE TORQUE/SPEED MESSAGE AS LOAD FEEDBACK FOR IMPLEMENT DRAFT CONTROL

BACKGROUND OF THE INVENTION

The present invention relates generally to hitches for attaching implements to agricultural tractors and more particularly to systems and methods for controlling the draft load of an implement connected to a tractor.

One of the most common uses of agricultural tractors is to move implements through agricultural fields to cultivate and condition the soil. Implements are commonly connected to the tractor using a front- or rear-mounted three-point hitch devices or towed using a drawbar. A three-point hitch device typically comprises two bottom lift arms, to which the implement is connected in rotary manner to selectively pivot about a given hinge axis; and a top link interposed between the tractor frame and the implement to control the angular position of the implement about the hinge axis. The lift arms are moved by a further actuating cylinder (or cylinders) interposed between the tractor frame and the lift arms, movement of the lift arms raising and lowering the implement with respect to the ground. Similarly, most trailed implements include one or more wheels pivotably connected to the implement in a manner to raise and lower the implement with respect to the ground offering an alternative method for altering implement position. Movement of the lift arms and/or implement-attached wheels is used to establish implement position with respect to the ground. Three-point hitches, as well as numerous variations thereof, are well known in the agricultural industry.

It is desirable, and sometimes critical for today's arming practices, to control the quality of cultivation performed by various ground-engaging devices attached to the frame of the implement. As the frame is lowered closer to the ground, the ground-engaging devices or tools dig or cut deeper into the soil and the draft load increases. As the frame is raised higher above the ground, the ground-engaging devices dig more shallowly into the soil and the draft load decreases. Typically, the operator has a manually operable device in the cab of the tractor that is manipulated to raise and tower the implement accordingly, whether by the three-point hitch or the implement wheels. When the operator finishes manipulating the device, the implement remains in the position set by the operator, but will not, however, maintain a desired depth of engagement or implement draft load as the tractor and implement move across the ground. Changes in field contour or soil hardness cause the depth of engagement and/or the draft load to change. To maintain the implement in a position to achieve a consistent draft load or depth of engagement, the operator must periodically look rearward and observe the implement. If the implement has drifted away from the desired depth of engagement, the operator must manipulate the depth control device to reposition the implement until the desired depth of engagement is reestablished. Similarly, changes in draft load may cause the engine to be bogged down, requiring operator adjustment of implement position to avoid stalling the engine. Therefore, even in systems in which the operator can adjust the implement position, periodic or semi-constant under some field conditions, visual monitoring of the implement position and adjustment of the hitch height input device is necessary to maintain the desired depth of engagement.

Hitch control systems for three-point hitch devices alleviate the need for manual operator hitch adjustments by controlling the position of the connected implement in response to loads applied to the tractor by the implement. The control systems allow the depth of engagement to be adjusted so that a constant draft load is applied to the tractor to smooth tractor operation. Alternatively, control systems may maintain the implement ground-engaging tools at a constant depth of engagement thereby allowing the implement tools to follow field contours. Such control systems typically use one or more measuring devices to sense the draft loads applied to the hitch by the implement and then generate a control output to adjust the hitch in response to the applied loads and desired position. Measuring devices add cost to the tractor and are subjected to generally harsh environments which increase failure rates and reduce reliability. The measurements used by these systems are more an indication of the load generated by the implement, with little or no consideration of other loads applied to the tractor engine, such as loads from the PTO, auxiliary hydraulics, cab air conditioning, cooling fans and the like. Such force sensing devices are typically installed only on rear three-point hitches which limits the draft control to rear hitched implements. Drawbar trailed or front hitch mounted implements cannot, therefore, be included in the draft load control systems.

Conventional hitch control systems are also generally limited in their inputs. Information on the type of attached implement and other engine loads is typically unavailable to the control system unless manually programmed into the control system. The type of implement attached to the tractor affects the relationship between depth and pulling force, the relationship between vertical forces and horizontal forces, tension versus compression, and center of gravity changes. As with other unmonitored engine loads, improperly set control parameters can also lead to engine stalling due to overload.

One alternative approach is to measure the drivetrain torques to determine draft loads. Various torque monitoring devices have been proposed or implemented. Drivetrain torque measurements provide a more direct indication of engine load and allow indirect measurement of draft load measurement. As with direct measurement of draft loads through the tractor hitch, drivetrain torque measurement inherited many similar drawbacks, including cost, noise, failure, reliability, and capacities.

It would be a great advantage to provide a system for controlling the depth of ground engagement (implement height) and therefore the draft load imposed on the tractor by the coupled implement in a manner to maintain a constant draft load on the tractor. Further advantages would be realized if the draft load control system would function for any connected implement regardless of whether the implement is connected to a front hitch, a rear hitch, or towed by a drawbar. Still further advantages would be realized if the draft load control system received inputs from existing sensing/control systems thereby alleviating the need for dedicated sensing components. These and other advantages are provided by the draft control system described below.

SUMMARY OF THE INVENTION

Accordingly, it is an object of the present invention to provide a draft control system for an agricultural tractor capable of controlling implement draft loads regardless of whether the implement is connected by a three-point hitch or towed by a drawbar.

It is a further object of the present invention to provide a hitch draft control system for an agricultural tractor that adjusts hitch position to maintain a more accurate constant load on the tractor engine.

It is a further object of the present invention to provide a draft control system for an agricultural tractor that adjusts actuators on the coupled implement to maintain a constant load on the tractor engine.

It is a further object of the present invention to automate a draft control system for an agricultural tractor to alleviate the need for an operator to manually monitor and control implement position to maintain a constant draft load on the tractor thereby reducing operator fatigue and increasing productivity.

It is a further object of the present invention to provide an automated draft control system for an agricultural tractor that maintains a constant draft load on the tractor thereby increasing tractor engine efficiency.

It is a still further object of the present invention to an automated draft control system for an agricultural tractor that utilizes existing parameter signals thereby eliminating the need for additional sensors and signal circuits.

It is a still further object of the present invention to provide an agricultural tractor draft control system that is durable in construction, inexpensive of manufacture, carefree of maintenance, easily assembled, and simple and effective to use.

These and other objects are achieved by providing a draft load control for an agricultural tractor having electronic engine and draft load controllers interconnected by a digital communications bus over which parameters for engine load are made readily available to the draft load controller.

BRIEF DESCRIPTION OF THE DRAWINGS

The advantages of this invention will be apparent upon consideration of the following detailed disclosure of the invention especially when taken in conjunction with the accompanying drawings wherein.

DESCRIPTION OF THE PREFERRED EMBODIMENT(S)

Many of the fastening connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the an and each will likewise not therefore be discussed in significant detail.

Figure 1:
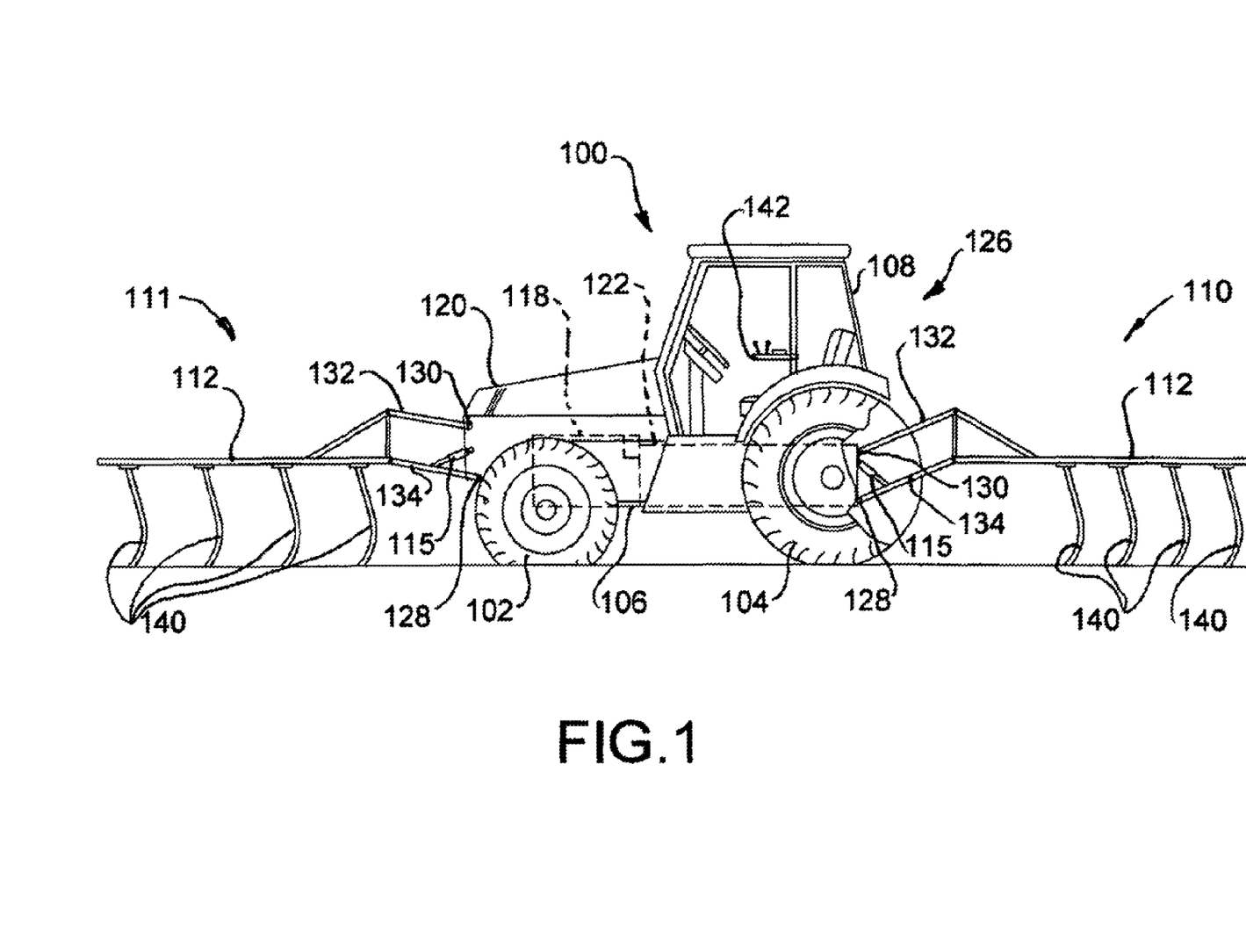
FIG. 1 is a side view of an agricultural tractor coupled to front- and rear-mounted ground-engaging implements by three-point hitches in accordance with the present invention.

Referring now to FIG. 1, there is illustrated an agricultural tractor 100 having a pair of front wheels 102, a pair of rear wheels 104, a chassis 106 and an operator's cab 108 from which the tractor can be comfortably operated. Tractor 100 is coupled to rear-mounted implement 110 and front-mounted implement 111 by rear-mounted three-point hitch 126 and front-mounted three-point hitch 127. Each implement has a frame or chassis 112 to which ground-engaging tools 140 are connected. Movement of their respective three-point hitches 126, 127 allows the position of implements 110, 111 to be adjusted.

The rear wheels 104 of tractor 100 are driven by tractor engine 118, which is disposed under a forwardly extending hood 120 located just in front of the operator compartment 108. A transmission 122 is fixed to the engine and includes a gearbox that provides a plurality of gear ratios. A differential 124 is fixed to the rear of the transmission 122 and transfers power to at least a pair of rear wheels 104. Engine 118, transmission 122, and differential 124 collectively comprise chassis 106. In an alternative configuration, a separate frame or chassis may be provided to which the engine, the transmission, and the differential are coupled, a configuration common in smaller tractors. Still other tractor configurations may drive all wheels on the tractor, use an articulated chassis to steer the tractor, or rely on tracks in lieu of wheels. The present invention is readily adaptable to most agricultural tractor application regardless of the tractor configuration.

The operator's cab 108 of tractor 100 is disposed toward the rear of the tractor just over and forward of the tractors rear three-point hitch 126. Rear-mounted implement 110 is coupled to tractor 100 by the rear three-point hitch 126. Also shown is front-mounted three-point hitch 127 to which front-mounted implement 111 is coupled. Tractor 100 may include a front-mounted implement, a rear-mounted implement, or both. Operator control of front and rear-mounted three-point hitches 126, 127 is accomplished through operator console 142.

Operation of three-point hitches is well known and similar for both front and rear-mounted three-point hitches 126 and 127. The following implement control discussion uses the rear-mounted implement 110 as an example. The description is equally applicable to the front-mounted implement 111 and should not be construed as limiting in any way.

The height of implement 110 is controlled by pivoting three-point hitch 126 about its pivotal couplings 128, 130 to tractor 100. Motive force for pivoting the three-point hitch is provided by a hitch position actuator 115 comprised of a hydraulic cylinder, which extends between the chassis 106 of tractor 100 and the three-point hitch, and a hydraulic control valve. Extension and retraction of the position actuator's 115 hydraulic cylinder is controlled by a hydraulic control valve (not shown) that receives selective input from the operator console or hitch control system. Operation and control of hydraulic cylinders is well known and not described further herein. When the position actuator 115 is extended and retracted, it raises and lowers inks 132, 134. Since implement 110 is coupled to these links at their distal ends, this causes the implement 110 to rise and fall.

implement 110 has several ground-engaging implements or tools 140 that are coupled to and extend downward from frame 112. These tools may include, for example, plows, rakes, harrows, or other ground cultivating devices. Whenever frame 112 is raised or lowered with respect to the ground, the depth of penetration of tools 140 is also increased or decreased. Thus, whenever position actuator's 115 hydraulic cylinder extends, tools 140 extend further toward or into the ground. Whenever position actuator's 115 hydraulic cylinder retracts, tools 140 move further from, or out of, the ground. As can be expected, changes in depth of penetration of the implement 110 into the ground affect the tractive effort (draft) required of the tractor to pull the implement through the ground.

Figure 2:
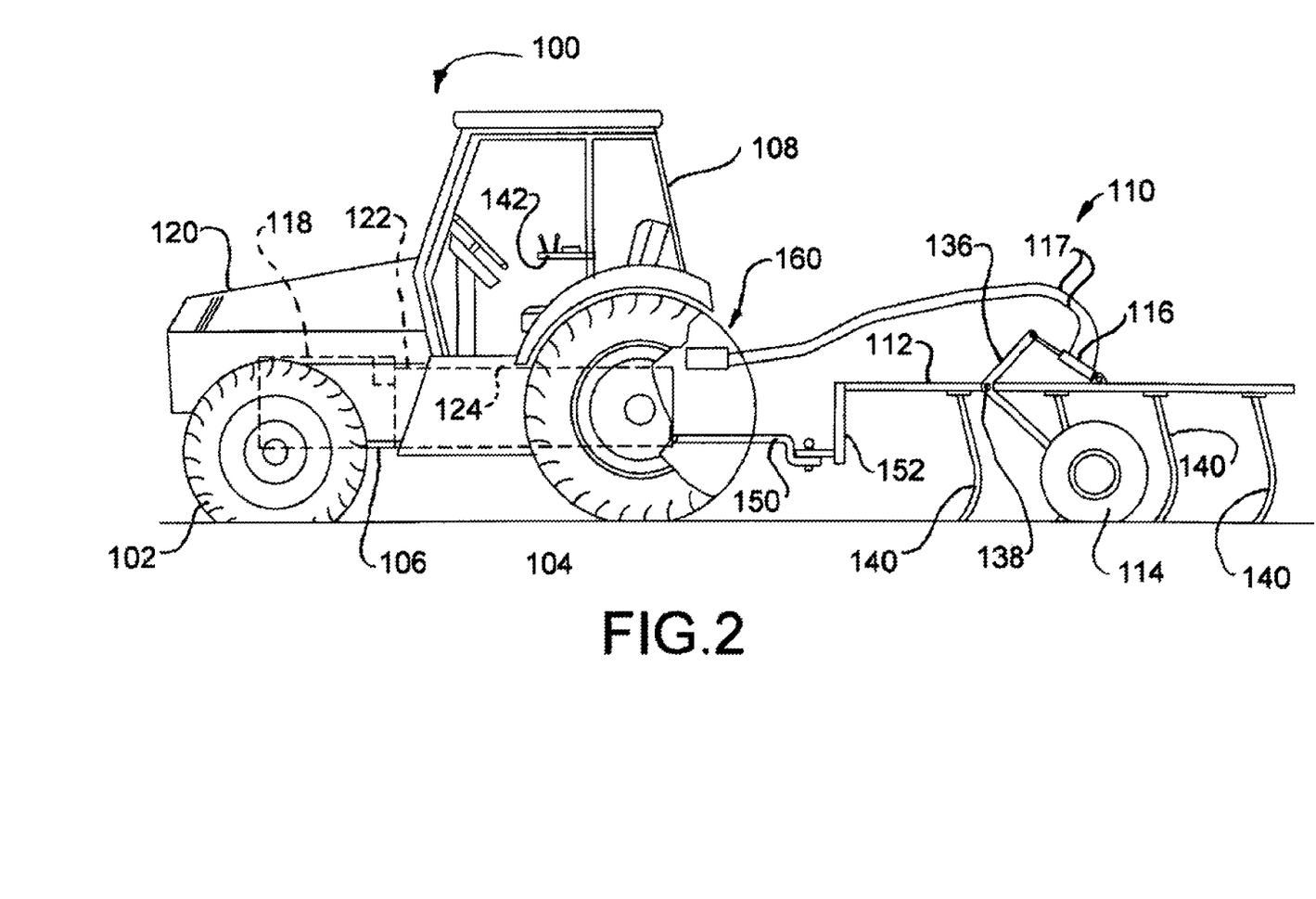
FIG. 2 is a side view of an agricultural tractor towing a ground-engaging implement by a drawbar in accordance with the present invention.

In FIG. 2, tractor 100 is shown towing implement 110. Tractor 100 includes drawbar 150 which provides a connection point for hitch 152 on implement 110. Height adjustment and thereby depth of engagement for towed implements cannot be adjusted by positioning the three-point hitch. Instead, the position of towed implements is controlled is by raising and lowering frame 112 of implement 110 with respect to implement wheels 114. Implement wheels 114 are rotationally coupled to a lower end of mechanical link 136. Link 136, in turn, is pivotally coupled to the frame 112 at pivot point 138. Link 136 is coupled to frame 112 to pivot clockwise or counterclockwise with respect to frame 112 about pivot point 138. Link 136 is pivoted by hydraulic cylinder 116, which is coupled to and between the upper end of plate 136 and frame 112. Movement of hydraulic cylinder 116, like hitch position actuator 115, is controlled by a hydraulic control valve 160 connected to hydraulic cylinder 116 by hoses 117. Hydraulic control valve 160, commonly referred to as the AUX valve on agricultural tractors receives selective input from the operator console or hitch control system. When cylinder 116 extends, it rotates link 136 counterclockwise with respect to the chassis. Due to the rearward angle at which the lower portion of link 136 extends, this counterclockwise rotation causes wheels 114 to rise upward toward frame 112. As a practical matter, since wheels 114 are typically resting on the ground when cylinder 116 is extended and retracted, wheels 114 do not actually "rise" or "fall." Instead, frame 112 rises or falls with respect to the wheels, and hence with respect to the ground. Thus, whenever hydraulic cylinder 116 extends, frame 112 lowers down towards the ground and whenever hydraulic cylinder 116 retracts, frame 112 rises up away from the ground. Using the frame 112 as a reference point, however, one can say that the wheels are "raised" or "lowered."

Figure 3:
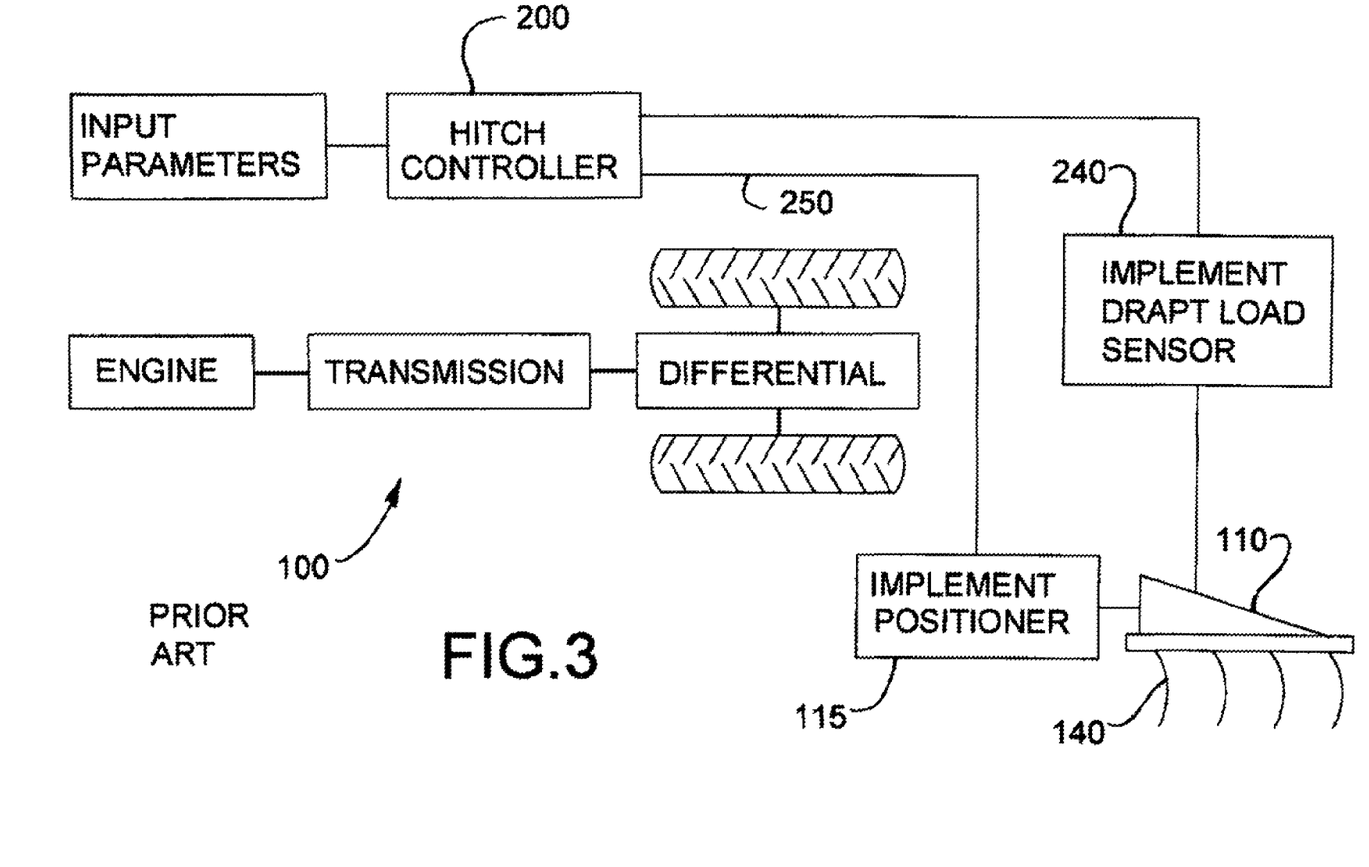
FIG. 3 is a schematic diagram of a prior art conventional draft control system for an agricultural tractor employing a direct measure of draft loads.

FIG. 3 is a schematic diagram of a conventional draft control system for an agricultural tractor in which a direct measure of draft loads is used as input for the draft load controller. Such systems typically use mechanical, hydraulic, electronic, or a combination of these measuring devices to monitor the draft loads applied on the tractor 100 by monitoring loads on the hitch. Draft load sensor 240 measures the loads applied to the hitch by implement 110 as it is pulled through the ground and communicates the information to hitch controller 200. Hitch controller 200 then compares the then-present draft load to a desired draft load calculates the difference, and generates draft control signal 250. The draft control signal 250 is communicated to the control valve for hydraulic cylinder 115 so that implement 110 will be repositioned to maintain a generally constant draft load on tractor 100.

Direct draft load measurement requires additional expensive sensing devices that add cost to the tractor and increase failures since the sensors are not welt-suited to tractor-induced vibration or exposure to harsh field conditions. This method of draft load control provides more of an indication of implement load on the tractor, with little or no indication of other loads applied to the tractor engine, such as loads from the PTO, auxiliary hydraulics, cab air conditioning, engine cooling fan(s), and the like. As additional, non-draft loads are applied, the power demand on the engine may exceed the available power thereby stalling the engine. Such control systems often need many input parameters about the type of implement so as to calculate the relationship between tool 140 vertical position and draft force, horizontal and vertical force relationships, tension versus compression, and central gravity changes. If the control parameters are not properly set, the engine can easily be stalled.

Figure 4:
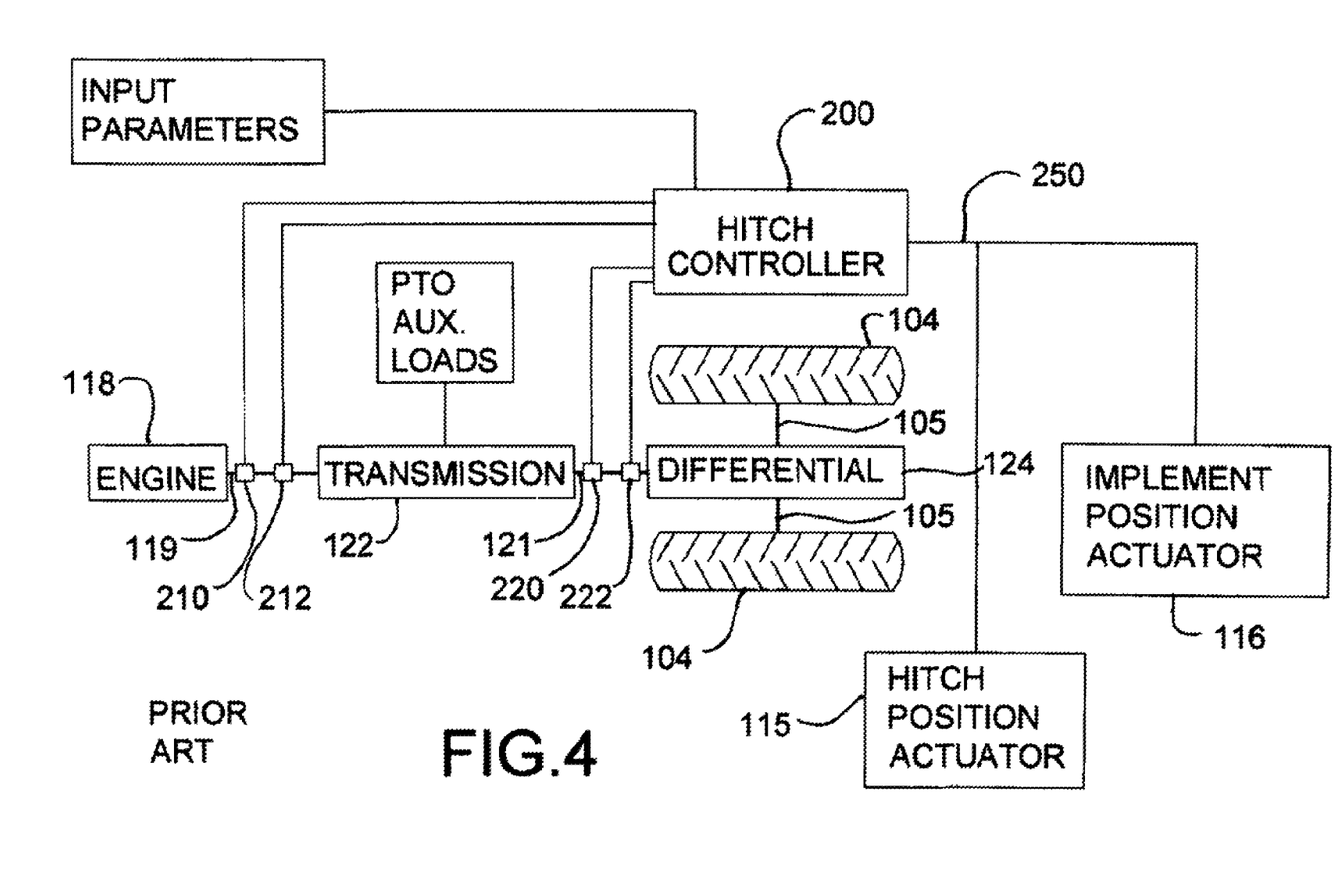
FIG. 4 is a schematic diagram of a prior art conventional draft control system for an agricultural tractor employing an indirect measure of draft loads.

FIG. 4 is a schematic diagram of a conventional draft control system for an agricultural tractor using torque measurements to derive draft load. Such systems typically use drivetrain torques to derive the draft loads applied upon the tractors by field conditions. In FIG. 3, engine 118 is interconnected by a shaft 119 to transmission 122. Transmission input speed sensor 210 and transmission input torque sensor 212 measure the speed and torque of the engine output shaft 119 and transmit representative signals to controller 200. Torque from transmission 122 is delivered to the ground through the drive wheels 104 by drive shaft 121 through differential 124, axles 105, to the drive wheels 104. Similar to the measurements of transmission input, drive speed sensor 220 and drive torque sensor 222 are fitted to drive shaft 121 to measure and transmit drive shaft speed and torque signals to hitch controller 200. Hitch controller 200 then derives the draft load and generates a draft control signal 250. The draft control signal is communicated to hitch position actuator 115 so that implement 110 will be repositioned to maintain a generally constant draft load. The disadvantages to this approach is that additional sensing devices are required which add cost to the tractor and increase failure rates since such sensors are susceptible to failures caused by tractor vibration or exposure to harsh field conditions. While this approach better addresses driving force loads applied to the tractor engine, it may not adequately sense other engine loads from the PTO, auxiliary hydraulics, cab air conditioning, engine cooling fan(s), and the like unless still more sensing devices are added. Additionally, torque monitoring offers an indirect indication of actual draft load that may be influenced by changes in engine load caused by other events or momentary fluctuations in drive torques, such as traversing a ditch, which may cause the implement to be inadvertently repositioned at a less than ideal height.

Figure 5:
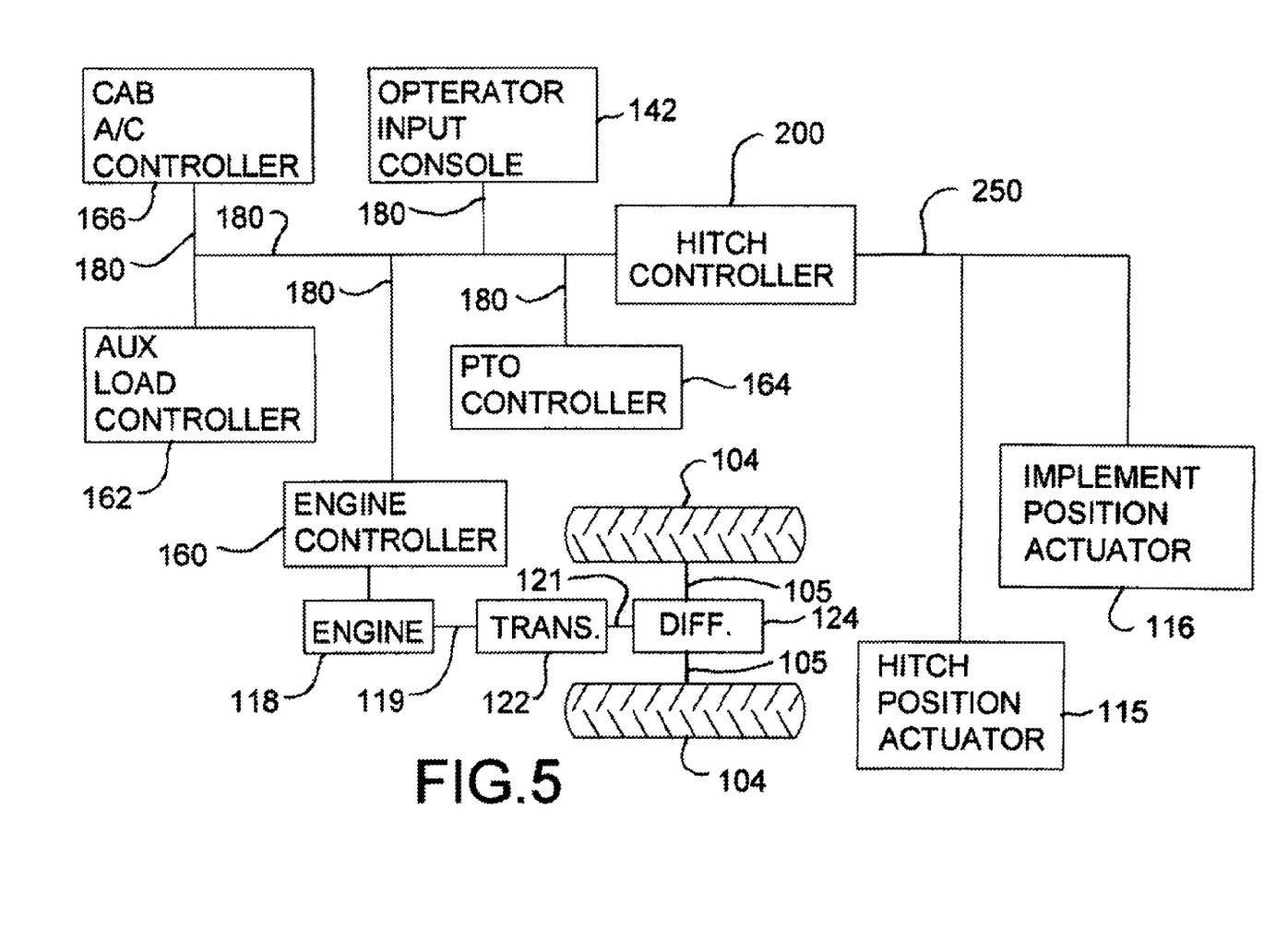
FIG. 5 is a schematic diagram of a draft control system for an agricultural tractor according to the present invention.

Referring now to FIG. 5, shown is a schematic diagram of a draft control system for an agricultural tractor according to the present invention. As in the prior art, engine 118 is connected by a shaft 119 to transmission 122. Power from transmission 122 is delivered to the ground by drive shaft 121 through differential 124, axles 105, and finally to the drive wheels 104 which engage the ground. Engine 118 is controlled by engine control system 160, which is an electronic governing system that includes a digital control and communication interface in the preferred embodiment. Engine control system 160 communicates with operator console 142 over communications bus 180, also referred to herein as the CAN bus. Operator console 142 includes a digital communication interface allowing it to interface with the CAN bus 180. From operator console 142, the operator may select, among other variables, a desired engine speed. The inputs are communicated from the operator console 142 via the CAN bus 180 to the engine control system that adjusts fuel delivery to the engine to maintain the desired engine speed.

The CAN bus conveys information from a variety of other controllers that enable the draft load to be accurately derived using existing sensor inputs. These controllers may include controllers for auxiliary hydraulics 162, the PTO 164, and cab air conditioning 166, among others. Engine torque monitoring and the hitch controller capabilities and processes have been discussed above. A key part of the control logic is differentiating other loads, such as the PTO, auxiliaries, cab air conditioning, from the draft load. Fortunately, most of these other non-draft loads are managed by controllers that communicate via the CAN bus 180. The on/off and proportional controls command information are either broadcast on the CAN bus or can be easily programmed. The working conditions of some such devices are even monitored by sensors, such as PTO speed sensor, AUX pressure sensor, A/C temperature sensors. Thus, the desired sensor information is either already available on the CAN bus or can be easily added. The control commands and sensed information quite often reveal the working status of the devices of concern and related loads can be estimated with considerable accuracy from the available information. Knowing the engine load and all non-draft loads allows the draft load to be quickly, easily, and accurately derived. With a reliable draft load signal, controlling implement position to maintain a substantially constant draft load is a conventional task for the hitch controller 200.

Hitch controller 200 is also connected to the CAN bus 180 in a manner that allows it to receive inputs from operator console 142. The function of hitch controller 200 is to adjust implement height to maintain a generally constant load on the tractor engine as the implement is pulled through the ground. The operator selects a desired draft load (load command) for pulling implement 110 and enters it at the operator console 142. Hitch controller 200 compares the desired draft load with the then-present draft load, which is derived from signals provided by the engine control system 160 and other controllers to the hitch controller 200 via CAN bus 180, and generates an error signal based on the difference. Based on the error signal hitch controller 200 generates a draft control signal 250 and transmits it to hitch position actuator 115, implement position actuator 116, or both depending on the mechanisms used to adjust implement height, so that implement 110 will be repositioned thereby causing changes in draft load and returning the draft load to the desired draft load. Through this process hitch controller 200 is able to maintain a generally constant load on engine 118 as the tractor 100 pulls implement 110 through the ground.

As previously pointed out, the digital controller used for hitch controller 200 and other digital controllers used in the tractor are coupled over the CAN bus 180. Engine control system 160 also includes a digital interface that enables it to communicate over the same CAN bus. The communications bus (CAN bus) 180 is preferably a controller area network bus such as the bus defined in the SAE J1939 standard. Individual communications circuits within the communications bus 180 are preferably Siemens or Motorola brand CAN bus controller circuits that are either integrally formed with the controllers or are coupled to the controllers. By using the existing CAN bus 180, the present invention obtains the necessary engine and drive load information without the need to employ additional, task-specific sensing circuits. These preferences are based upon actual field test results, and reflect choices made thereon. However, it should be obvious that components other than these will work, and certainly improvements by other manufacturers will be made and may prove even more suitable than those specifically identified herein. Additionally, while a serial communications protocol is described, use of other protocols (e.g., parallel) are equally suitable and thus not precluded by this invention.

Figure 6:
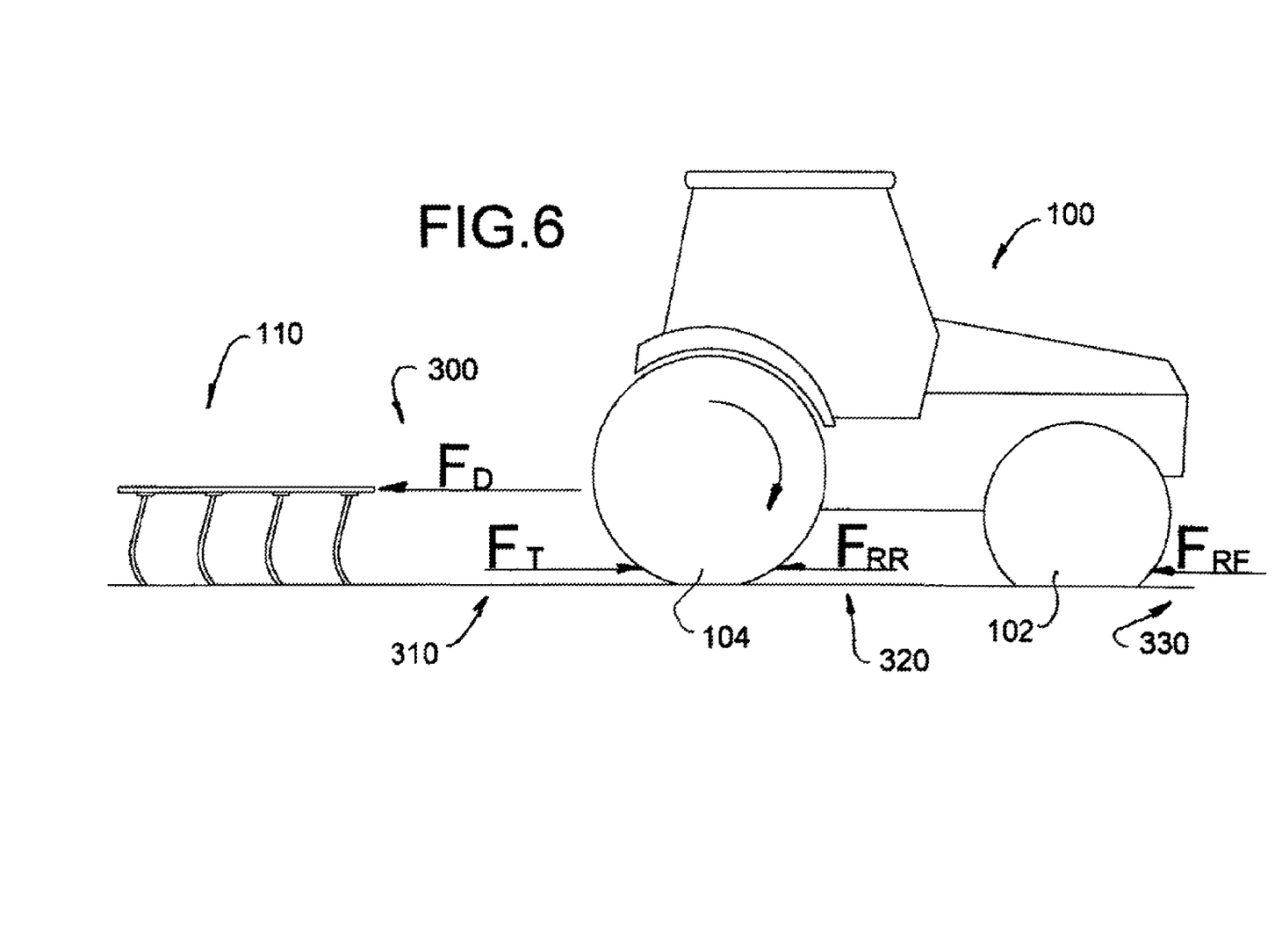
FIG. 6 is a diagram showing the relationship of various force vectors acting on the tractor and attached implement.

As shown in FIG. 6, when tractor 100 pulls an implement 110, the draft load, $F_D$, shown as vector 300, is the horizontal resistance caused by the interaction between the ground-engaging tools 140 and the ground. A traction force, $F_T$, shown as vector 310, is created by driving wheels 104 that is opposite in direction to the draft load vector 300 ($F_D$). The traction force 310 ($F_T$) must overcome not only the draft load 300 ($F_D$), but also rolling resistances of the front wheels, $F_{RF}$, (vector 330) and rear wheels, $F_{RR}$, (vector 320). All forces are in horizontal direction and along the axis of travel of the tractor 100. The sum of the forces should be substantially zero when the tractor-implement system is operating in a steady state across the ground surface as shown in the following equations:

$$\Sigma F = F_T - F_{RR} - F_{RF} - F_D = 0$$

$$F_T = F_D + F_{RR} + F_{RF}$$

Traction 310 ($F_T$) is an approximately linear function of the draft load 300 ($F_D$). $T_D$ represents various disturbance torques in the system as detected on the engine flywheel shaft. Knowing other constants such as final drive ratio, $Z_F$, transmission gear, $Z_T$, and tire rolling radius, R, allows the traction force $F_T$ (vector 310) to be expressed in terms of engine torque, $T_E$.

$$F_T * R = (T_E - T_D) * Z_T * Z_F$$

These relationships thus enable the draft load $F_D$ (vector 300) to be directly related to engine torque, $T_E$ given a particular transmission gear selection $Z_T$.

$$F_D = \frac{1}{R}(T_E - T_D) * Z_T * Z_F - F_R$$

As both engine torque $T_E$ and transmission gear selection $Z_T$ are available from the serial bus, these parameters can be easily used by the hitch controller 200 to maintain a substantially constant draft load 300 ($F_D$) on the tractor 100.

Figure 7:
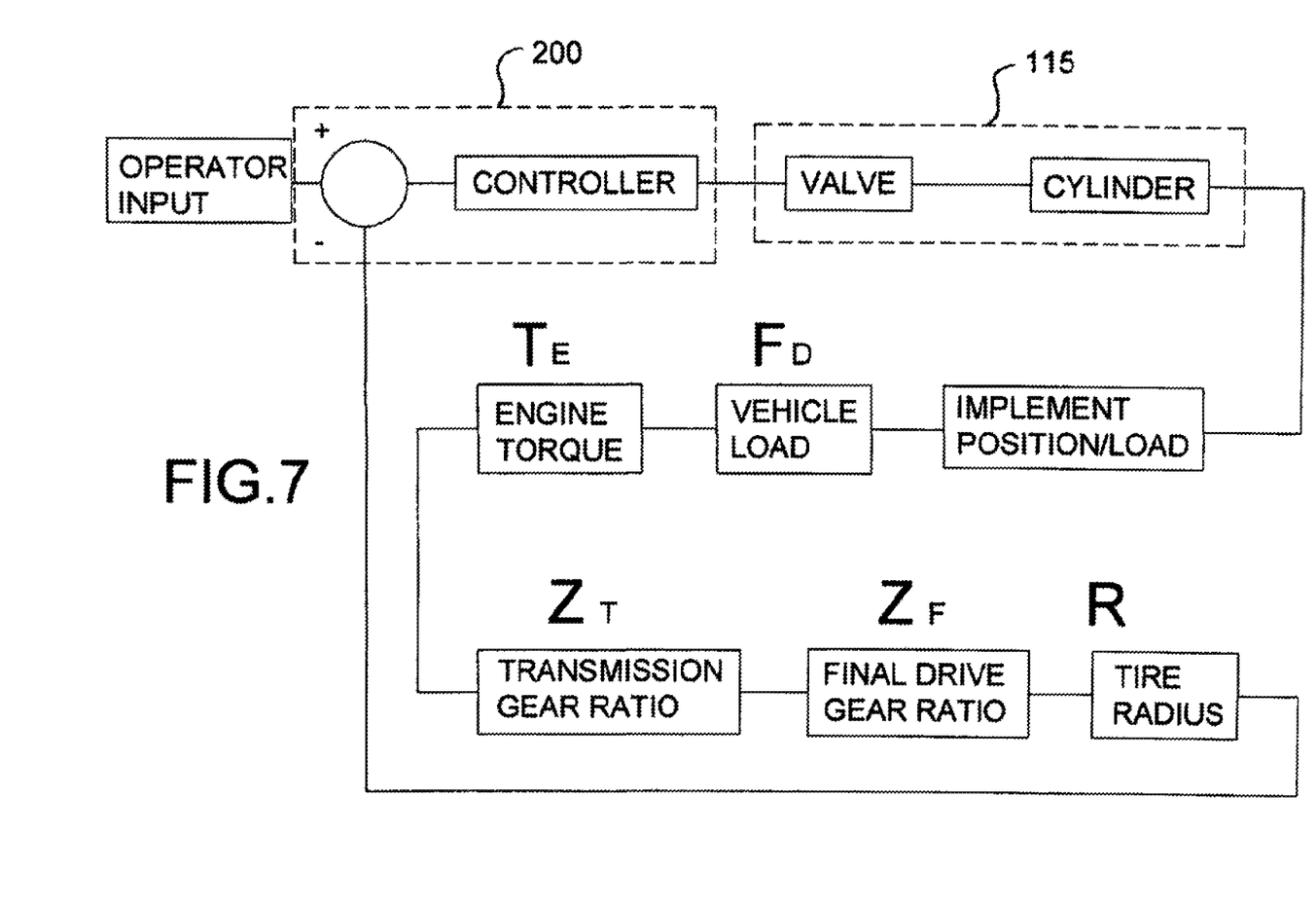
FIG. 7 is a logic diagram for the present invention.

FIG. 7 shows the general control logic used by the hitch controller 200 to maintain substantially constant draft load using readily available inputs. The operator sets a desired draft load value from the operator console 142. As implement 110 is pulled through the ground, an initial draft load is created based on the depth of the implement and the soil characteristics. For purposes of this discussion, the tractor 100 is assumed to be operating under steady state conditions so that the initial draft load is substantially equal to the desired draft load thereby generating a zero error signal. When implement 110 encounters ground areas containing harder soil, the draft load increases above the initial value. The increased draft load causes the tractor engine torque to increase and the error signal, that being the difference between the then-present engine load and the desired draft load, provided to the controller increases as well. Based on the increasing magnitude of the error signal, the controller will generate a control output to various actuation valves to raise the hitch and/or implement actuator cylinder and thereby the implement such that draft load is reduced. With the implement repositioned, the error signal returns to zero and the system reaches a new equilibrium at an elevated implement position.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. A draft load control system for positioning a ground-engaging implement coupled to an agricultural tractor, said tractor comprising:
   a ground-supported frame;
   an engine supported on said frame for propelling said tractor, said coupled implement, and the operative components thereof;
   a vehicle electronic communication system;
   at least one auxiliary component powered by said engine and creating at least one auxiliary load;
   at least one auxiliary load controller for controlling power from said engine to said at least one auxiliary load, said auxiliary load controller providing at least one output signal to said vehicle electronic communication system;
   an engine control system for selectively controlling torque and speed of said engine, said engine control system providing at least one output signal to said vehicle electronic communication system; said engine control system including at least one engine digital controller configured for directly adjusting the engine;
   an operator input apparatus, said operator input apparatus accepting a desired draft load value and providing a corresponding desired draft load signal to said vehicle electronic communication system;
   said ground-engaging implement having a position actuator disposed to raise and lower said implement with respect to the ground in response to an implement position control signal; and
   said tractor having a draft load controller connected to said vehicle electronic communication system to receive said engine control system output signal, said at least one auxiliary load controller output signal, and said desired draft load signal, and derive, in accordance with its programming, and send an implement position control signal to said implement position actuator to manage said implement position based on said position control signal whereby a substantially constant draft load is maintained on said tractor and wherein said vehicle electronic communication system is a controller area network.

2. The draft load control system of claim 1, wherein said at least one auxiliary load controller includes at least one auxiliary load digital controller and is configured for monitoring at least one load placed on the engine other than the draft load.

3. The draft load control system of claim 2, wherein said draft load controller is a digital controller.

4. The draft load control system of claim 3, wherein said controller area network comprises a communication link connecting said at least one engine digital controller, said at least one auxiliary load digital controller, and said draft load digital controller and the draft load controller configured to calculate the draft load of the vehicle from at least one signal received from the controller area network indicating the engine torque and a detected state of a transmission of the vehicle.

5. The draft load control system of claim 1, wherein said tractor further comprises a three-point hitch movable in upward and downward directions by a hitch actuator, said implement being connected to said three-point hitch enabling said hitch to raise and lower said implement, said hitch actuator, being responsive to said implement position control signal, causes, when necessary, adjustment of said three-point hitch thereby changing implement position and actual draft load on said tractor.

6. The draft load control system of claim 5, wherein said engine control system includes at least one engine digital controller, said at least one auxiliary load controller includes at least one auxiliary load digital controller, said draft load controller is a digital controller, and said vehicle electronic communication system comprises a communication link connecting said at least one engine digital controller, said at least one auxiliary load digital controller, and said draft load digital controller.

7. The draft load control system of claim 6, wherein said draft load controller, upon receiving said engine control system output signal and said at least one auxiliary load controller output signal from said vehicle electronic communication system derives an actual draft load value, receives said desired draft load value from said vehicle electronic communication system and compares said actual draft load value to said desired draft load value, calculates an error signal based on the difference between said actual draft load value and said desired draft load value, generates an implement position control signal having a value, and sends said implement position control signal to said implement position actuator to manage said implement position based on said position control signal thereby causing said error signal to be substantially zero thereby maintaining a substantially constant draft load on said tractor.

8. A method for controlling the draft load of a ground-engaging implement coupled to an agricultural tractor, the method comprising the steps of:
   providing a ground-supported agricultural tractor having an engine for motive power, an operator's platform, and an implement position actuator movable in upward and downward directions responsive to an implement position control signal, the engine being selectively controlled by at least one engine load controller;
   providing a ground-engaging implement attached to the tractor and thereby propelled by said tractor;
   providing an operator input apparatus at the operator platform to establish a desired draft load value;
   providing at least one auxiliary component selectively powered by the engine thereby creating at least one auxiliary load, the at least one auxiliary component being selectively controlled by at least one auxiliary load controller;
   providing a vehicle electronic communication system connecting the at least one engine load controller, the at least one auxiliary load controller, and the operator input apparatus;
   providing a draft load controller connected to the vehicle electronic communication system;
   setting the desired draft load value using the operator input apparatus;
   communicating the desired draft load value to the draft load controller via the vehicle electronic communication system;
   operating the tractor to cause the implement to engage the ground thereby creating an actual draft load on the tractor;
   generating an engine load value by the at least one engine load controller, wherein the engine load value is determined by an engine control system having at least one digital controller;
   generating at least one auxiliary load value in the auxiliary load controller;
   communicating the engine load value and the least one auxiliary load value to the draft load controller via a vehicle electronic communications system;
   determining by the draft load controller a draft load value based on the engine load and the at least one auxiliary load value determined by at least one auxiliary load digital controller configured to control additional load on the engine other than the draft load, wherein the additional load is produced by at least one of a power take-off of a tractor, a cab air conditioning system or an engine cooling fan;

comparing the actual draft load value to the desired draft load value;

calculating an error signal based on the difference between the actual draft load value and the desired draft load value, generating an implement position control signal having a value, communicating the implement position control signal to the implement position actuator;

changing the implement position based on the value of the implement position control signal thereby causing the error signal to be substantially zero and managing a substantially constant draft load on the tractor.

9. The method of claim 8 wherein said draft load controller is a digital controller.

10. The method of claim 9, wherein said vehicle electronic communications system comprises a communication link connecting said at least one engine controller, said at least one auxiliary load controller, and said draft load controller and wherein the draft load control calculates a draft load from the engine load determined from inputs from the engine controller and at least one auxiliary load representing load on the engine other than the draft load and determined form inputs from the at least one auxiliary load controller.

11. In an agricultural tractor for propelling a connected ground-engaging implement, said tractor having an engine for propelling said tractor and said implement, an engine control system for selectively controlling torque and speed of said engine responsive to an operator input, and an operator input apparatus, an implement position actuator for selectively varying position of said connected ground-engaging implement, wherein the improvement comprises:

a digital draft load controller;

at least one digital engine controller in said engine control system;

at least one auxiliary load powered by said engine, power from said engine to said at least one auxiliary load being by at least one auxiliary load controller having at least one digital auxiliary load controller;

a vehicle electronic communication system for sending and receiving signals from said operator input apparatus, said digital draft load controller, said digital engine controller, and said digital auxiliary load controller, wherein said vehicle communication system is a controller area network and comprises a communication link connecting said at least one digital engine controller, said at least one digital auxiliary load controller, and said digital draft load controller; and said digital draft load controller connected to said vehicle electronic communications system to receive an engine load signal from said digital engine controller and at least one auxiliary load signal from said at least one digital auxiliary load controller, and derive, in accordance with its programming, and send an implement position control signal to said implement position actuator to manage said implement position based on said position control signal whereby a substantially constant draft load is maintained on said tractor; and wherein said draft load controller, upon receiving said digital engine controller signal and said at least one digital auxiliary load controller signal from said vehicle electronic communication system derives an actual draft load value, the actual draft load value derived using the engine torque, a state of the transmission of the vehicle and significant auxiliary loads placed on the engine other than the draft load, the draft load controller receives said desired draft load value from said vehicle electronic communication system and compares said actual draft load value to said desired draft load value, generates an implement position control signal configured to command the implement to a position such that the difference between the derived actual draft load and desired draft load is reduced.

* * * * *